United States Patent
Ludwig et al.

(10) Patent No.: US 10,001,502 B2
(45) Date of Patent: Jun. 19, 2018

(54) FASTENING DEVICE FOR AN ELECTRONIC COMPONENT, IN PARTICULAR AN ACCELERATION SENSOR FOR AIRBAG SYSTEMS

(71) Applicant: Robert Bosch GmbH, Stuttgart (DE)

(72) Inventors: Matthias Ludwig, Moessingen (DE);
Juergen Kurle, Reutlingen (DE);
Conrad Haeussermann, Trochtelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 98 days.

(21) Appl. No.: 14/928,881

(22) Filed: Oct. 30, 2015

(65) Prior Publication Data
US 2016/0139168 A1 May 19, 2016

(30) Foreign Application Priority Data

Nov. 17, 2014 (DE) ......................... 10 2014 223 404

(51) Int. Cl.
*G01P 1/02* (2006.01)
*B60R 21/01* (2006.01)

(52) U.S. Cl.
CPC .............. *G01P 1/023* (2013.01); *B60R 21/01* (2013.01); *B60R 2021/01006* (2013.01); *B60R 2021/01013* (2013.01)

(58) Field of Classification Search
CPC . G01P 1/02; G01P 1/023; B60R 21/01; B60R 2021/01006; B60R 2021/01013

USPC .......................................................... 73/493
See application file for complete search history.

(56) References Cited

U.S. PATENT DOCUMENTS

| | | | | |
|---|---|---|---|---|
| 3,803,670 A * | 4/1974 | Johnson | ................... | A47C 5/00 411/508 |
| 4,927,287 A * | 5/1990 | Ohkawa | ................ | F16B 21/086 24/297 |
| 5,568,675 A * | 10/1996 | Asami | ................. | F16B 19/1081 24/297 |
| 5,745,347 A * | 4/1998 | Miller | ..................... | B60R 21/01 361/807 |
| 5,945,606 A * | 8/1999 | Tokunaga | ............... | B60C 23/04 374/E1.018 |
| 8,695,177 B2 * | 4/2014 | Kato | ..................... | F16B 21/065 24/292 |

(Continued)

FOREIGN PATENT DOCUMENTS

FR 2971218 A1 8/2012

*Primary Examiner* — Benjamin Schmitt
(74) *Attorney, Agent, or Firm* — Norton Rose Fulbright US LLP; Gerard Messina (57) ABSTRACT

A fastening device for an electronic component, in particular an acceleration sensor for airbag systems, in which the electronic component is fixable in a motor vehicle with the aid of fastening elements, a first connection pair being present both on the motor vehicle and on the housing of the electronic component, which interlocks in a form-locked and/or force-fit manner for a pre-mounting of the electronic component and a second connection pair is present on the housing of the electronic component and on the motor vehicle, with the aid of which the electronic component may be fastened and positioned on the vehicle. The second connection pair is made up of a clip connection.

14 Claims, 9 Drawing Sheets

(56) References Cited

U.S. PATENT DOCUMENTS

| | | | |
|---|---|---|---|
| 2005/0019130 A1* | 1/2005 | Kanie | F16B 19/1081 411/45 |
| 2009/0285648 A1 | 11/2009 | Gosis et al. | |
| 2009/0300893 A1* | 12/2009 | Herrmann | B60R 11/02 24/595.1 |
| 2010/0044528 A1* | 2/2010 | Jimenez | B60R 11/00 248/74.1 |
| 2014/0310945 A1* | 10/2014 | Kanie | F16B 19/1081 29/525.06 |

* cited by examiner

FASTENING DEVICE FOR AN ELECTRONIC COMPONENT, IN PARTICULAR AN ACCELERATION SENSOR FOR AIRBAG SYSTEMS

RELATED APPLICATION INFORMATION

The present application claims priority to and the benefit of German patent application no. 10 2014 223 404.2, which was filed in Germany on Nov. 17, 2014, the disclosure of which is incorporated herein by reference.

FIELD OF THE INVENTION

The present invention is directed to a fastening device for an electronic component, in particular an acceleration sensor for airbag systems.

BACKGROUND INFORMATION

Airbag systems are known from the related art which, among other things, use acceleration sensors for crash detection. These acceleration sensors are usually mounted on the motor vehicle using a fastening screw. To ensure the ability to mount such sensors single-handedly during installation, the sensor is prefixed to the vehicle's body by, for example, a clip connection. The main function of such pre-mounting clips is to fix the sensor in its position on the vehicle in such a way that it is possible to insert and screw in the actual fastening screw. An oval shape of the mounting clip in combination with the screw position provides an unambiguous mounting condition. On the vehicle side, two openings and a thread, usually a weld nut, must be present on the vehicle sheet metal. A disadvantage of this type of attachment is the overdimensioning of the screw attachment in relation to the weight of the sensor. The sensor could be attached using a substantially smaller screw without a loss of its performance (service life, signal transmission, signal transit time, reliability of the airbag deployment). However, smaller screws than M6 are generally not used by the OEMs in body construction. Furthermore, the screw connection is detachable; however, this is generally not used, since the service life of the sensor is at least equal to or even longer than the life of the vehicle.

SUMMARY OF THE INVENTION

An object of the present invention is to provide, as an alternative to the related art, a fastening option for such sensors which does not exhibit the above-named disadvantages.

The present invention is directed to a fastening device for an electronic component, in particular an acceleration sensor for airbag systems, in which the electronic component may be fixed in a motor vehicle with the aid of fastening elements, a first connection pair being provided both on the motor vehicle and on the housing of the electronic component, the two elements of which interlock in a form-locked and/or force-fit manner for a pre-mounting of the electronic component, and a second connection pair is present on the housing of the electronic component and on the vehicle, with the aid of which the electronic component may be fastened on the vehicle. The essence of the present invention is that the second connection pair is made up of a clip connection.

The proposed fastening method for an acceleration sensor of an airbag system on the body of a motor vehicle makes it possible for the acceleration sensor to be clipped directly onto the body of the motor vehicle, the fastening elements being integrated into the housing of the sensor, so that no additional components are required. In contrast to the above-described known fastening methods, the following advantages are achieved:
1. Less space required
2. Weight savings
3. More cost-effective due to the elimination of a bushing, a screw and a nut welded to the body
4. The use of existing openings on the vehicle is possible.

Additional advantageous embodiments and improvements of the fastening device according to the present invention are listed in the subclaims.

The clip connection is made up of a peg, which may be snapped into an opening, the snap-in peg may be formed on the housing of the electronic component.

For a form-locked and/or force-fit connection, the snap-in peg has detents on its free end, which engage in the mounted state at the inner wall of the opening provided in the body.

The snap-in peg is configured to be hollow on the inside for accommodating a fixing pin. The fixing pin ensures a permanent and reliable fastening of the electronic component on the body of the motor vehicle.

On its shaft, the fixing pin has at least one snap clip, with the aid of which the fixing pin may be audibly locked in the snap-in peg in its end position, so that the correct installation of the sensor is ensured.

The fastening device may have an additional adhesion, which is used to increase the durability of the fastening for the electronic component further. The adhesion may be configured as a pre-mounted adhesive tape, which is provided with a peelable protective film.

DETAILED DESCRIPTION

Figure 1:
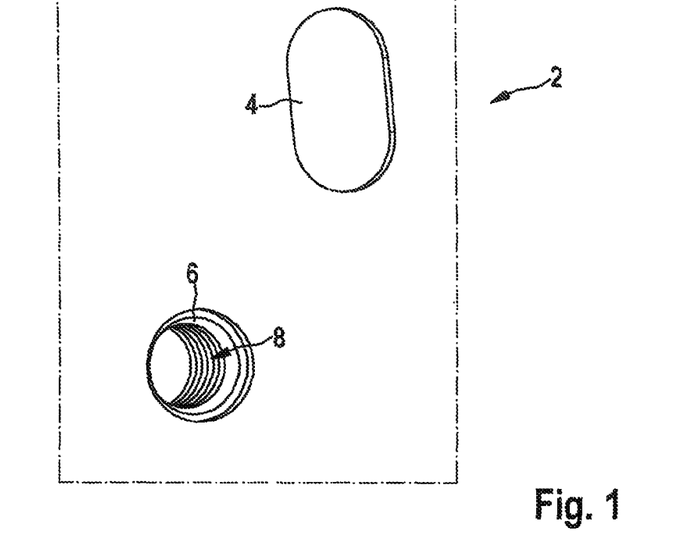
FIG. 1 shows a vehicle-side fastening for a sensor according to the related art.
Figure 2:
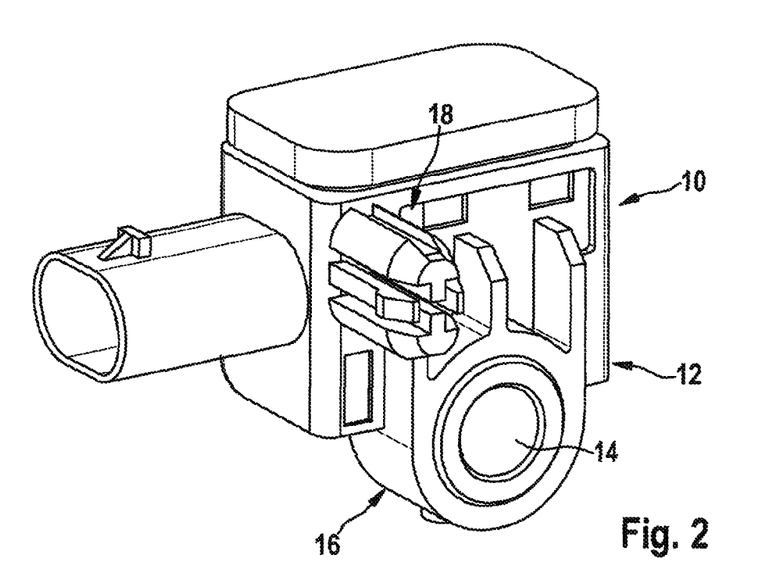
FIG. 2 shows a sensor including fastening arrangement according to the related art, which correspond to the vehicle-side fastening depicted in FIG. 1.
Figure 3:
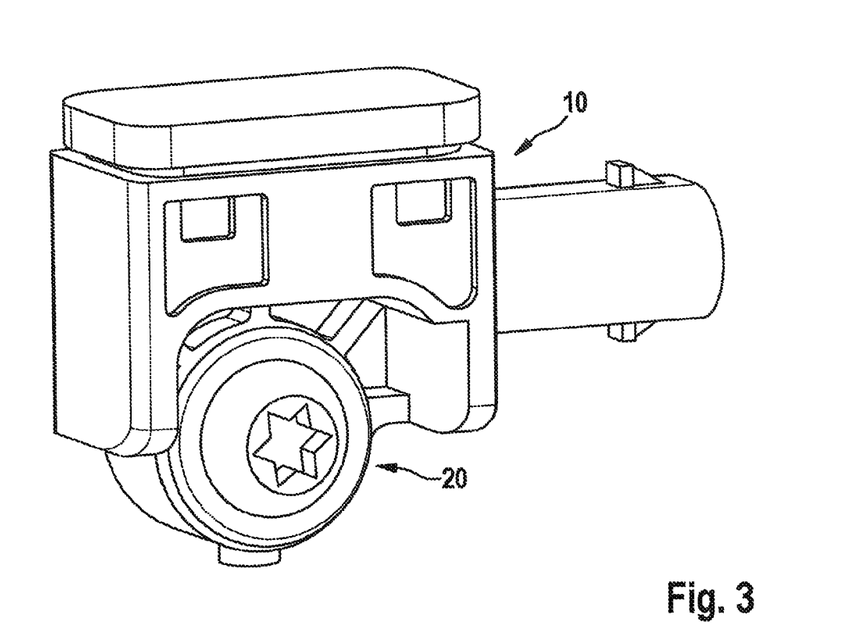
FIG. 3 shows a view of the mounted sensor according to FIG. 2.

A fastening for a sensor as known from the related art is shown in FIGS. 1 through 3. For this purpose, a body sheet metal 2 of a motor vehicle has a first opening 4 configured in the shape of an oval and a second circular opening 6. The opening formed in the body sheet metal is furthermore provided with a welded-on nut 8. Sensor 10 to be fastened on body sheet metal 2 has a housing 12, in which a flange 16 is formed and provided with a through-opening 14. Also formed on housing 12 is an elastic peg 18 provided with multiple segments, which in the mounted state engages in the oval-shaped opening 4 in a form-locked manner. As shown in FIG. 3, sensor 10 is then fastened captively on body sheet metal 2 with the aid of a screw 20—which is screwed into weld nut 8 using its thread.

A first exemplary embodiment of the fastening device according to the present invention is shown in FIGS. 4 through 11. For this purpose, housing 22 of sensor 24 has on its rear side 26 a peg 28 formed integrally from housing 22, which is made up of four individual detents 30 through 36. The external diameter of snap-in peg 28 increases toward its free end, the free ends of four detents 30 through 36 each being provided with a bevel.

Figure 4:
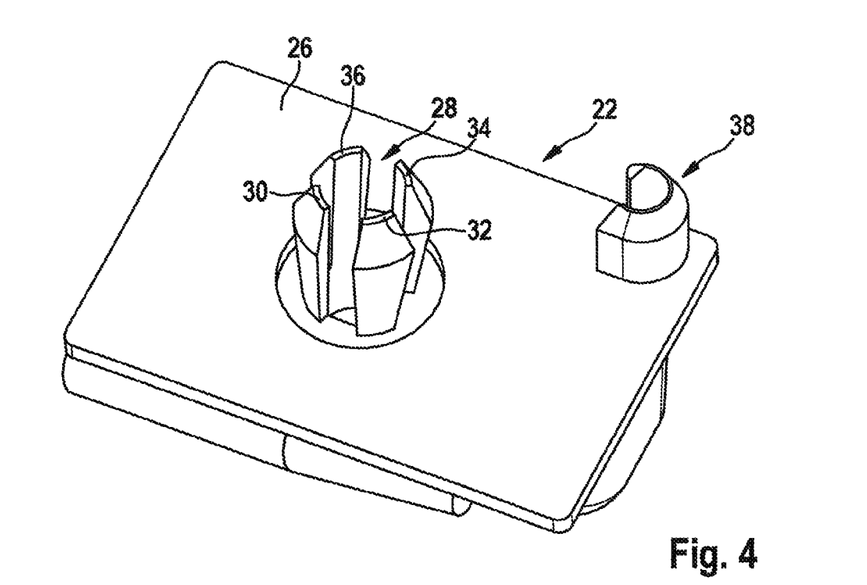
FIG. 4 shows a sensor including fastening arrangement according to a first exemplary embodiment.
Figure 6:
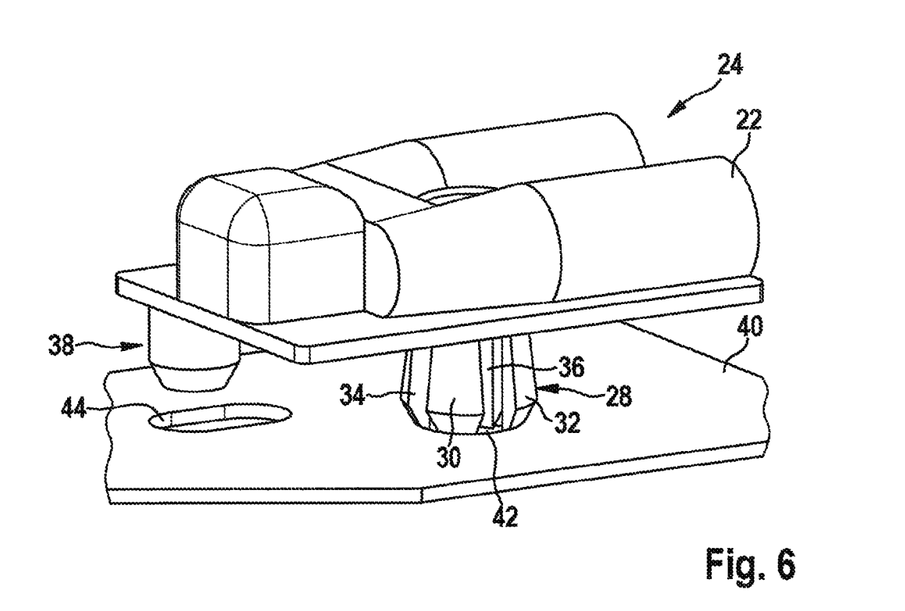
FIG. 6 shows the sensor according to the first exemplary embodiment as well as the section of a vehicle sheet metal corresponding to it.
Figure 7:
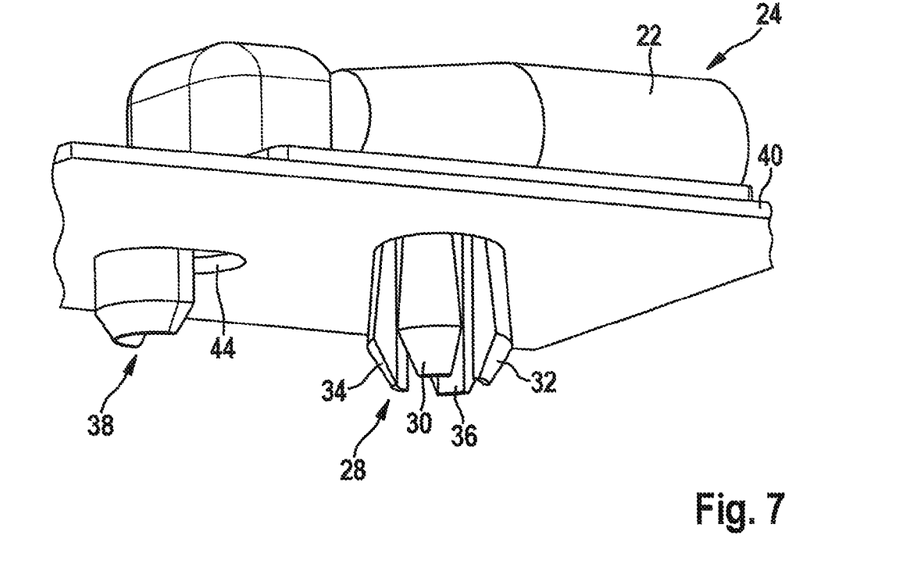
FIG. 7 shows the sensor pre-inserted in the vehicle sheet metal according to FIG. 6.
Figure 8:
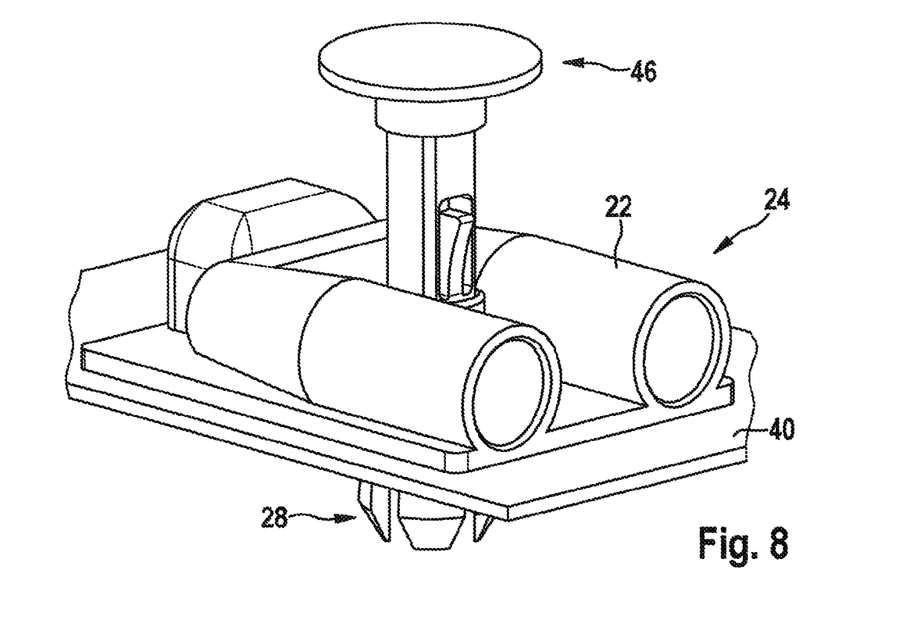
FIG. 8 shows the sensor mounted in the vehicle sheet metal including the pre-inserted fixing pin according to FIG. 5.
Figure 9:
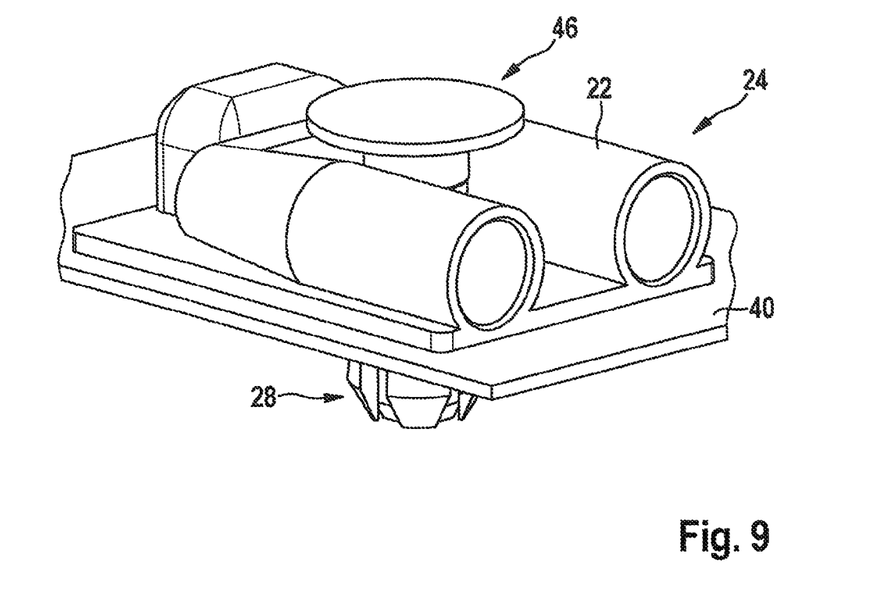
FIG. 9 shows the sensor including the mounted and locked fixing pin.
Figure 10:
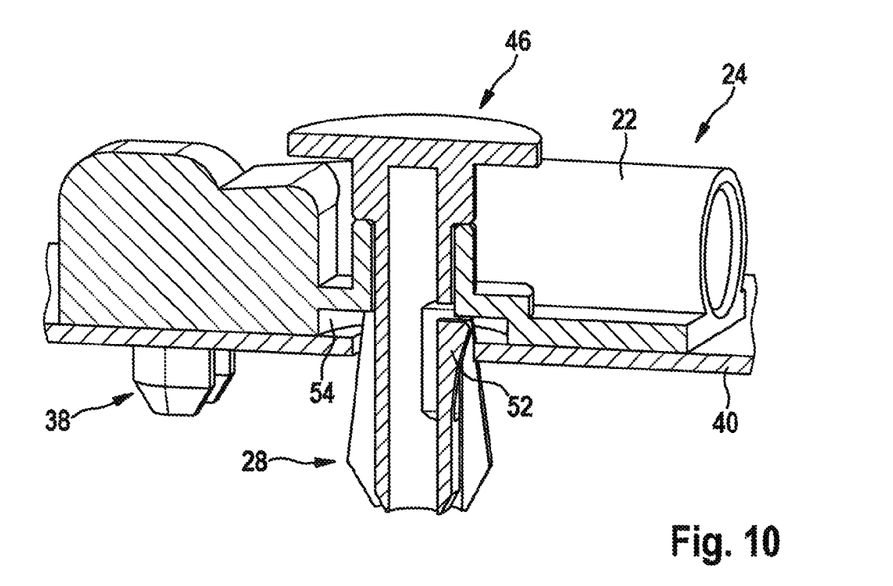
FIG. 10 shows a first sectional representation of the sensor including the mounted and locked fixing pin.
Figure 11:
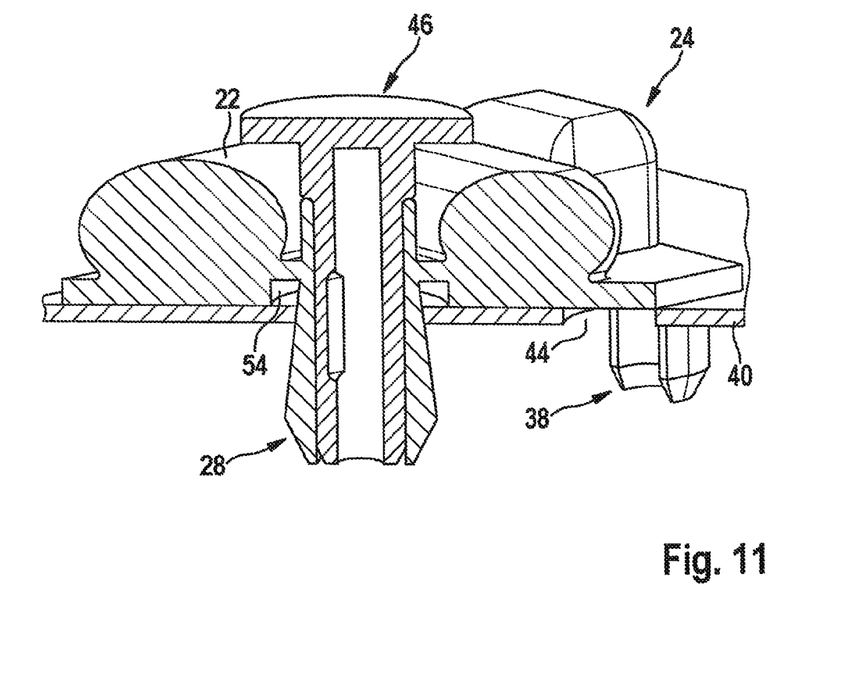
FIG. 11 shows a second sectional representation of the sensor including the mounted and locked fixing pin.

Furthermore, housing 22 has a rib 38 formed as a semi-circle on its rear side 26 configured to be planar. For the mounting or for the fastening of sensor 24 on the body of a vehicle, vehicle sheet metal 40 is provided with a first circular opening 42 and with a second oval opening 44. For the mounting of sensor 24, peg 28 configured to be hollow on the inside is inserted into circular opening 42 using its detents 30 through 36; at the same time, rib 38 is accommodated in oval opening 44, rib 28 formed as a semi-circle coming into contact at a section of the inner wall of opening 44 without play. Due to the expansion of snap-in peg 28 in the outer diameter and the re-expansion of detents 30 through 36 after the insertion of snap-in peg 28 into opening 42, and due to the engagement of rib 38 into opening 44, sensor 24 is already captively and non-rotatably fastened on the body or on vehicle sheet metal 40.

Figure 5:
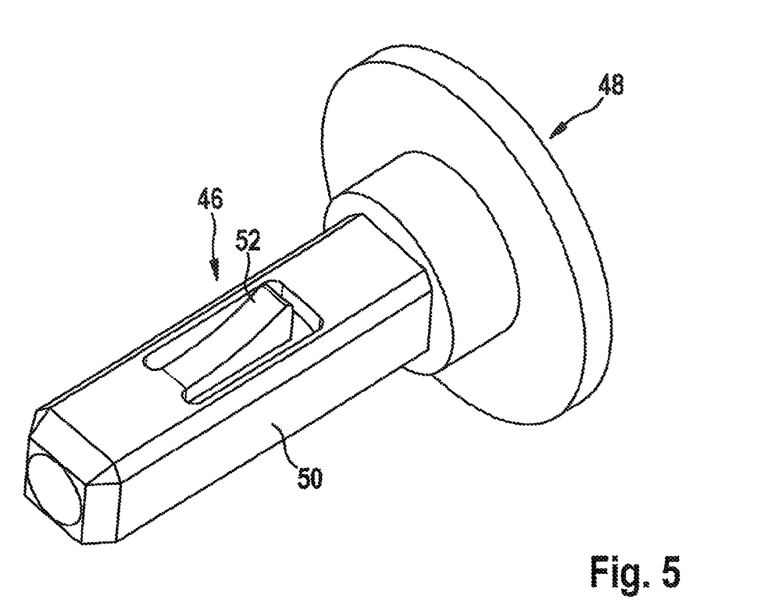
FIG. 5 shows a fixing pin for the fastening of the sensor according to the first exemplary embodiment.

After mounting is completed, the clip connection made up of snap-in peg 28 and opening 42 is locked with the aid of a fixing pin 46, which, for example, is shown in FIG. 5. Fixing pin 46 is made up of a plate-shaped head part 48 and a shaft section 50. Shaft section 50 in turn has a snap clip 52 formed integrally from the shaft.

Fixing pin 46 is pushed into snap-in peg 28 configured to be hollow on the inside, it being locked audibly in its end position. This ensures that sensor 24 is mounted correctly. The locking is ensured in that snap clip 52 of fixing pin 46 engages through the space between two of the total of four detents 30 through 36, and its end resiliently comes into contact with the inner wall of opening 42 formed in vehicle sheet metal 40. Fixing pin 46 may no longer be withdrawn, since in this case, the head end of snap clip 52 comes into contact with the bottom of a tapering opening which is provided in sensor housing 22 for accommodating and guiding fixing pin 46 (see FIG. 10).

As in the present case, fixing pin 46 is configured as a separate component.

Figure 12:
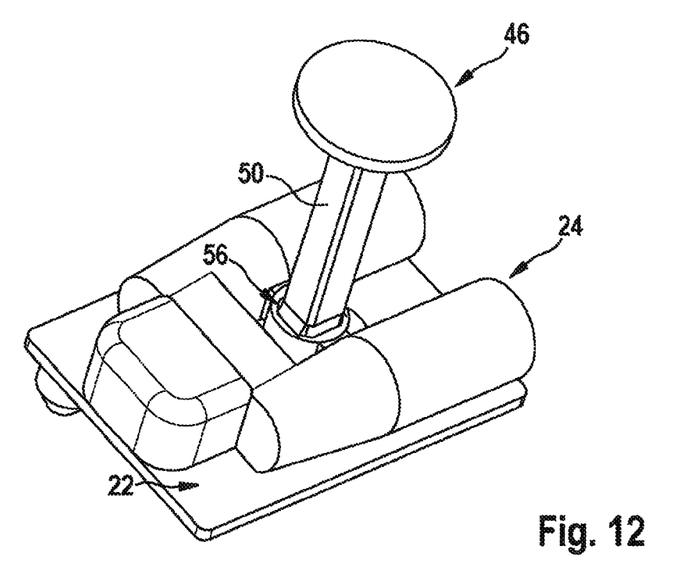
FIG. 12 shows the sensor including a fixing pin fastened on the housing according to a first specific embodiment.

In another exemplary embodiment according to FIG. 12, fixing pin 46 is integrally connected to sensor housing 22 via thin plastic elements 56 and is manufactured as a single piece. This connection is separated during installation. Depending on the configuration, this may be carried out either before the insertion of fixing pin 46 by breaking off fixing pin 46 or, as an alternative to this, not until the point in time when fixing pin 46 is pressed into the hollow space of snap-in peg 28.

Figure 13:
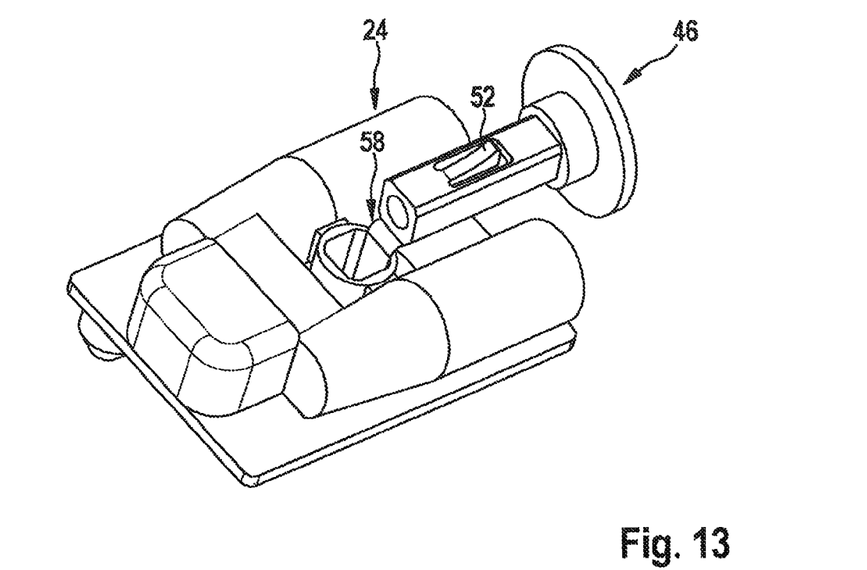
FIG. 13 shows the sensor including a fixing pin fastened on the housing according to a second specific embodiment.

Another single-piece specific embodiment of a fixing pin 46 fastened on sensor housing 22 is shown in FIG. 13, in this specific embodiment the fixing pin being folded down by 90° and connected to sensor housing 22 via a thin plastic web 58.

Figure 14:
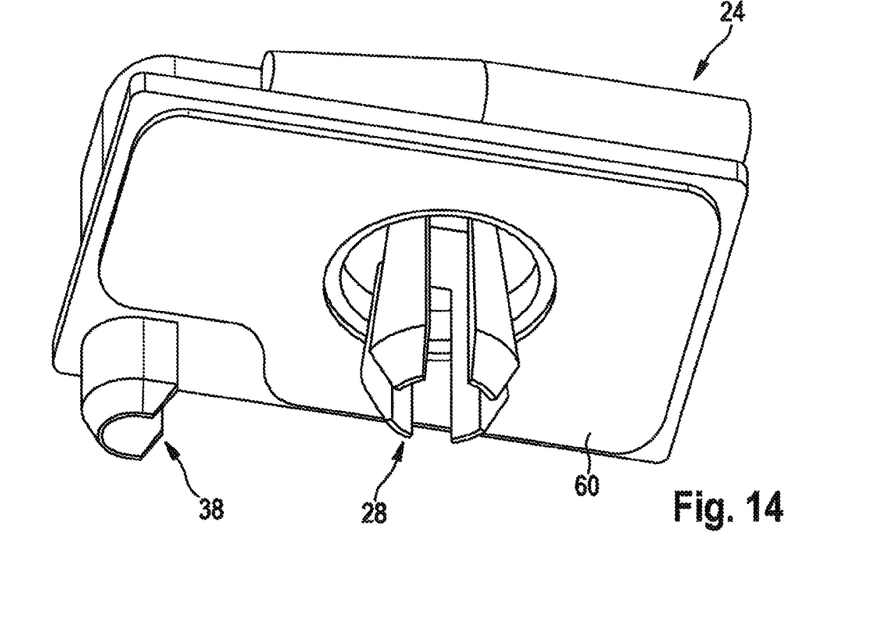
FIG. 14 shows the sensor including its housing and an additional adhesion.
Figure 15:
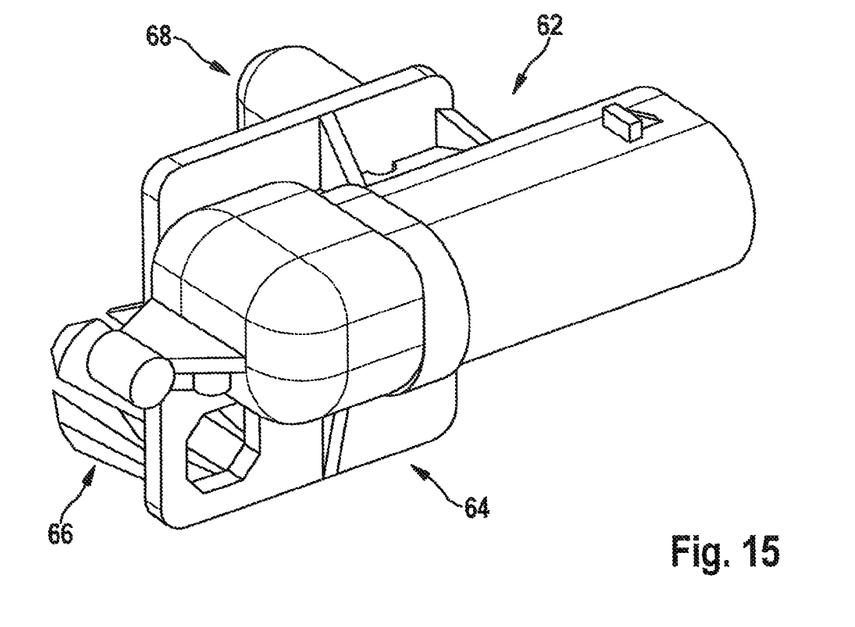
FIG. 15 shows a sensor including a fastening according to a second exemplary embodiment in a first perspective view.
Figure 16:
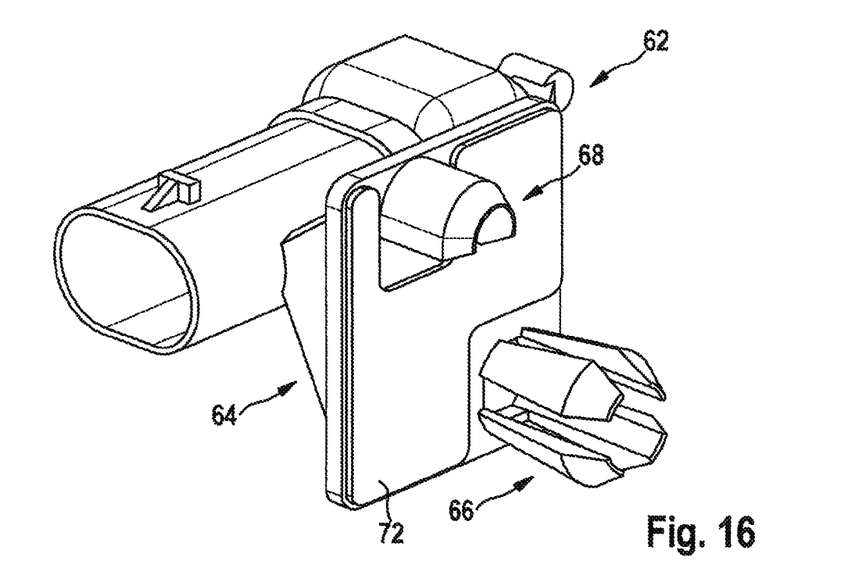
FIG. 16 shows the sensor in a second perspective view.
Figure 17:
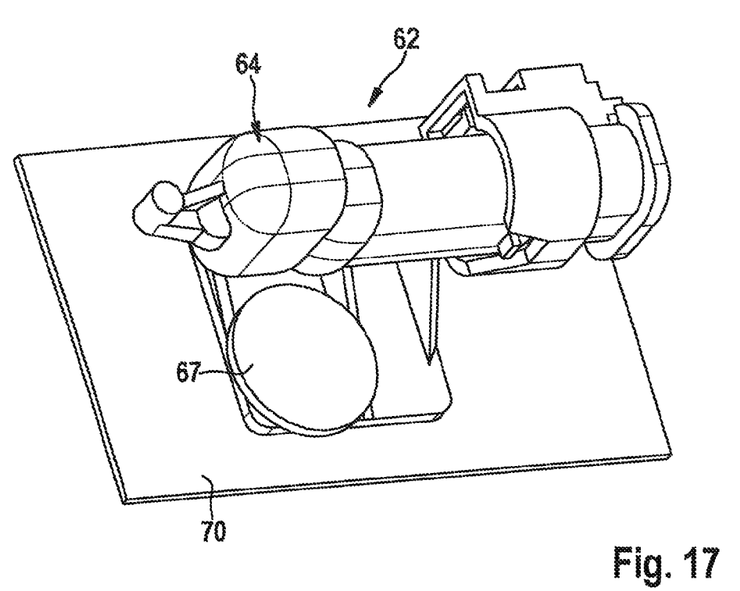
FIG. 17 shows the sensor completely mounted on the vehicle sheet metal according to the second exemplary embodiment in a first perspective view.
Figure 18:
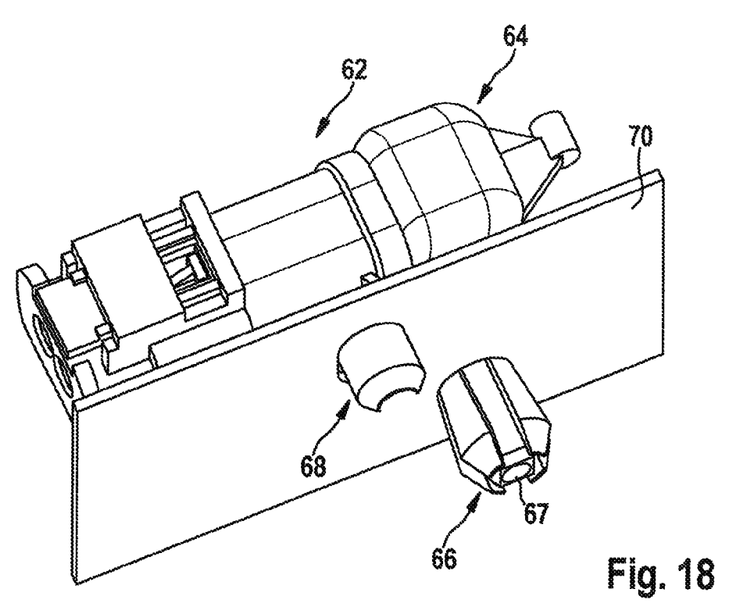
FIG. 18 shows the mounted sensor in a second perspective view.

In another specific embodiment in FIG. 14, the flat rear side of sensor 24 is provided with an adhesion which additionally secures the fastening of sensor 24 on vehicle sheet metal 40. For this purpose, the adhesion—as shown in FIG. 14—may be configured as a pre-mounted adhesive tape, which is provided with a peelable protective film.

FIGS. 15 through 18 show a sensor 62 configured in a somewhat different manner, the sensor being provided with a "classic contacting" in the vehicle by known connector systems. However, sensor 62 has the same fastening elements, as were described in the previous exemplary embodiments. This means that housing 64 of sensor 62 again has a snap-in peg 66, which is made up of multiple individual detents. Furthermore, a rib 68 formed as a semi-circle is again provided, which is also integrally formed from housing 64 of the sensor. The two elements, i.e., snap-in peg 66 and positioning rib 68, penetrate corresponding openings formed in vehicle sheet metal 70 in the mounted state. In this case, snap-in peg 66 is again secured in the mounted state by a corresponding fixing pin. The flat side of sensor housing 64 is in turn provided with an adhesive tape 72 for additional securing of the fastening.

Of course, the fastening for the electronic component described above is not limited to the special application in a sensor for airbag systems. Instead, the fastening is conceivable and suitable for many other areas of application.

What is claimed is:

1. A fastening device for an electronic component, in which the electronic component is fix-able in a motor vehicle with fastening elements, comprising:
   a first connection pair on the motor vehicle and on a sensor housing of the electronic component; and
   a second connection pair on the sensor housing of the electronic component and on the vehicle, by which the electronic component is fasten-able and position-able on the vehicle;
   wherein:
   two elements of the first connection pair interlock in at least one of a form-locked and force-fit manner for a pre-mounting of the electronic component;
   a first one of the two elements of the first connection pair includes a positioning element on the sensor housing;
   the sensor housing includes a plate with a hole therethrough;
   the second connection pair includes a fixing pin and a snap-in peg formed on the sensor housing;
   the snap-in peg includes a plurality of flexible ribs protruding from a bottom surface of the plate and arranged around the hole, the ribs extending from (a) proximal ends of the ribs at which the ribs are attached to the surface of the plate to (b) distal ends of the ribs that are below the bottom surface of the plate;

the fixing pin includes a shaft that is insertable into the hole in a direction from the proximal ends towards the distal ends until a stop position beyond which the shaft is not further insertable in the direction from the proximal ends towards the distal ends;

the shaft includes a cut-out forming a clip that extends radially outward away from a longitudinal axis of the shaft, between two of the ribs of the snap-in peg so that at least a portion of the clip is circumferentially sandwiched between the two of the ribs; and the clip includes a stop surface that, when the fixing pin is at the stop position, abuts upwards against the bottom surface of the plate at a circumferential coordinate, about the longitudinal axis, not occupied by the ribs.

2. The fastening device of claim 1, wherein the second connection pair further includes an opening provided in the vehicle and into which the snap-in peg is configured to.

3. The fastening device of claim 2, wherein a diameter of the snap-in peg is dimensioned so that the ribs are flexibly in contact with an inner wall of the opening in a mounted state in which the electronic component is fixed in the motor vehicle.

4. The fastening device of claim 1, wherein the fixing pin and snap-in peg are configured as separate components.

5. The fastening device of claim 1, wherein the fixing pin is connected to the sensor housing by thin webs.

6. The fastening device of claim 1, wherein a second one of the two elements of the first connection pair is an opening into which the positioning element engages for an unambiguous positioning of the electronic component on the vehicle.

7. The fastening device of claim 6, wherein the positioning element is configured as a rib provided with a radius.

8. The fastening device of claim 1, wherein the electronic component is additionally secured on the vehicle by an adhesion.

9. The fastening device of claim 8, wherein the adhesion is configured as an adhesive tape having a peel-able protective film which is pre-mounted on the electronic component.

10. The fastening device of claim 1, wherein the electronic component includes an acceleration sensor for an airbag system.

11. An electronic component, comprising:
a sensor housing on which a snap-in peg, a fixing pin, and a positioning element are provided for fastening on a body of a motor vehicle;
wherein:
the sensor housing includes a plate with a hole therethrough;
the snap-in peg includes a plurality of flexible ribs protruding from a bottom surface of the plate and arranged around the hole, the ribs extending from (a) proximal ends of the ribs at which the ribs are attached to the surface of the plate to (b) distal ends of the ribs that are below the bottom surface of the plate;
the fixing pin includes a shaft that is insertable into the hole in a direction from the proximal ends towards the distal ends until a stop position beyond which the shaft is not further insertable in the direction from the proximal ends towards the distal ends;
the shaft includes a cut-out forming a clip that extends radially outward away from a longitudinal axis of the shaft, between two of the ribs of the snap-in peg so that at least a portion of the clip is circumferentially sandwiched between the two of the ribs; and
the clip includes a stop surface that, when the fixing pin is at the stop position, abuts upwards against the bottom surface of the plate at a circumferential coordinate, about the longitudinal axis, not occupied by the ribs.

12. The electronic component of claim 11, wherein the sensor housing has an adhesion on its flat rear side.

13. The electronic component of claim 11, wherein the sensor housing has an adhesion, which is a pre-mounted adhesive tape, on its flat rear side.

14. The electronic component of claim 11, wherein the electronic component includes an acceleration sensor for an airbag system.

* * * * *